US012175804B2

(12) United States Patent
Shui et al.

(10) Patent No.: US 12,175,804 B2
(45) Date of Patent: Dec. 24, 2024

(54) SYSTEM FOR QUERY VEHICLE DATA

(71) Applicant: FORD GLOBAL TECHNOLOGIES, LLC, Dearborn, MI (US)

(72) Inventors: Huanyi Shui, Ann Arbor, MI (US); Zhe Wang, Northville, MI (US); Devesh Upadhyay, Canton, MI (US); Brandon M. Dawson, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 368 days.

(21) Appl. No.: 17/547,667

(22) Filed: Dec. 10, 2021

(65) Prior Publication Data

US 2023/0186691 A1 Jun. 15, 2023

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0816* (2013.01)

(58) Field of Classification Search
CPC ..... G07C 5/008; G07C 5/0808; G07C 5/0816
See application file for complete search history.

(56) References Cited

U.S. PATENT DOCUMENTS 6,745,151 B2 * 6/2004 Marko ................ G07C 5/0808 702/182
8,732,112 B2 5/2014 Singh et al.
8,762,165 B2 6/2014 Gilbert et al.
8,831,911 B2 9/2014 Lipowsky et al.
9,127,946 B1 * 9/2015 Menon .................... H04L 67/12
9,544,205 B2 1/2017 Chandrayana et al.
2013/0190967 A1 * 7/2013 Hassib ................ G07C 5/0816 701/31.5
2014/0201126 A1 * 7/2014 Zadeh .................... A61B 5/165 706/52
2018/0240288 A1 * 8/2018 Samper .................. G07C 5/006
2019/0244445 A1 * 8/2019 Kyes .................... G07C 5/0816
2019/0378351 A1 * 12/2019 Dorenkamp ......... G07C 5/0816

FOREIGN PATENT DOCUMENTS

WO 2010/033106 A1 3/2010
WO WO-2014097305 A1 * 6/2014 ............. G07C 5/008
WO WO-2015139709 A1 * 9/2015 ........... G05B 23/024

OTHER PUBLICATIONS

JP-2005158012-A with English translation. (Year: 2005).*
DE 112019001842 T5 with English translation. (Year: 2021).*
Pritha Bhandari, "How to Calculate Variance | Calculator, Analysis & Examples", published Jan. 18, 2023, retrieved from https://www.scribbr.com/author/pritha/ (Year: 2023).*

* cited by examiner

*Primary Examiner* — Calvin Cheung
(74) *Attorney, Agent, or Firm* — Joseph Zane; Brooks Kushman P.C.

(57) ABSTRACT

A server includes an interface configured to communicate with a plurality of vehicles; and a processor, programmed to, send a query to the plurality of vehicles, the query identifying types of vehicle data and indicating an initial sampling rate, responsive to receiving the vehicle data sampled by the vehicles, process the vehicle data to obtain a feature result including an estimated value and a variance extending from the estimated value, and responsive to the variance being greater than a first threshold, send a first updated query indicating an increased sampling rate to the plurality of vehicles.

20 Claims, 4 Drawing Sheets

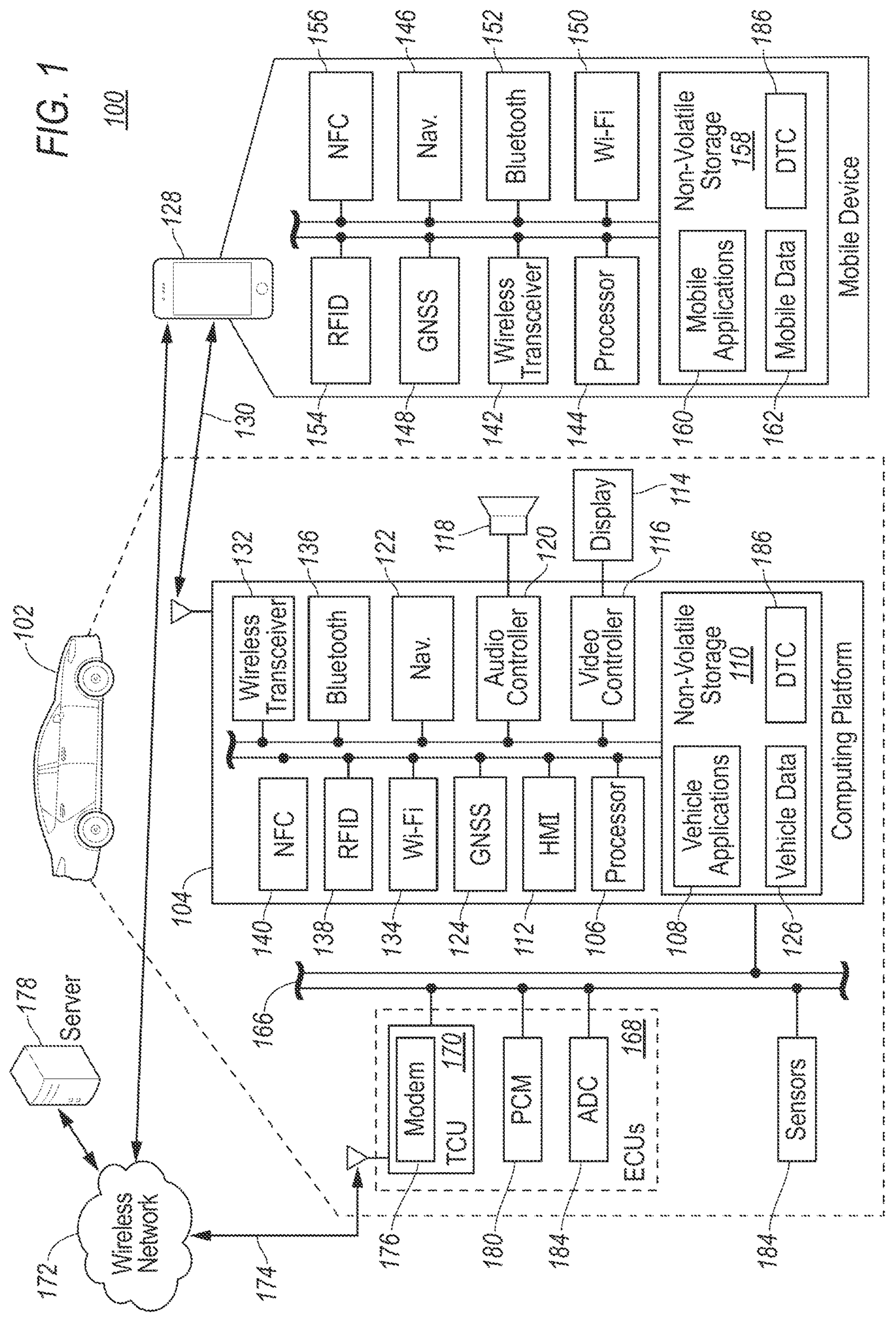
FIG. 1
100
102
128
130
Server
178
Wireless Network
172
174
Wireless Transceiver
Bluetooth
Nav.
Audio Controller
Video Controller
Display
118
120
116
114
132
136
122
NFC
RFID
Wi-Fi
GNSS
HMI
Processor
Non-Volatile Storage 110
DTC
186
Vehicle Applications
Vehicle Data
Computing Platform
104
140
138
134
124
112
106
108
126
166
Modem 170
TCU
PCM
ADC
ECUs 168
Sensors
176
180
184
184
NFC
Nav.
Bluetooth
Wi-Fi
RFID
GNSS
Wireless Transceiver
Processor
Non-Volatile Storage 158
DTC
Mobile Applications
Mobile Data
Mobile Device
156
146
152
150
186
154
148
142
144
160
162

300A

300B

300C

400

SYSTEM FOR QUERY VEHICLE DATA

TECHNICAL FIELD

The present disclosure generally relates to a system for querying vehicle data from a server to issue detections.

BACKGROUND

Vehicle connectivity allows a manufacturer to remotely access data of one or more vehicles to perform feature processing and identify any issues before a diagnostics trouble code (DTC) is triggered. To make the system work, the manufacturer requires sufficient vehicle data for analysis. However, most vehicles have limited wireless bandwidth and may only send limited amount of data.

SUMMARY

In one or more illustrated embodiments of the present disclosure, a server includes an interface configured to communicate with a plurality of vehicles; and a processor, programmed to, send a query to the plurality of vehicles, the query identifying types of vehicle data and indicating an initial sampling rate, responsive to receiving the vehicle data sampled by the vehicles, process the vehicle data to obtain a feature result including an estimated value and a variance extending from the estimated value, and responsive to the variance being greater than a first threshold, send a first updated query indicating an increased sampling rate to the plurality of vehicles.

In one or more illustrated embodiments of the present disclosure, a method for a server includes responsive to receiving an input indicative of a vehicle feature analysis, identifying a plurality of vehicles qualified for the vehicle feature analysis; sending a query to the plurality of vehicles, the query identifying types of vehicle data and indicating an initial sampling rate, responsive to receiving the vehicle data sampled by the vehicles, processing the vehicle data to obtain a feature result including an estimated value and a variance extending from the estimated value, and responsive to the variance being less than a first threshold, sending a first updated query indicating a decreased sampling rate to the plurality of vehicles.

In one or more illustrated embodiments of the present disclosure, a non-transitory computer readable medium includes instructions, when executed by a server, make the server to responsive to receiving an input indicative of a vehicle feature analysis, identify a plurality of vehicles qualified for the feature analysis; send a query to the plurality of vehicles, the query identifying types of vehicle data and indicating an initial sampling rate, responsive to receiving the vehicle data sampled by the vehicles, process the vehicle data to obtain a feature result including an estimated value and a variance extending from the estimated value, and responsive to the variance being greater than a first threshold, send a first updated query indicating an increased sampling rate to the plurality of vehicles.

BRIEF DESCRIPTION OF THE DRAWINGS

For a better understanding of the invention and to show how it may be performed, embodiments thereof will now be described, by way of non-limiting example only, with reference to the accompanying drawings, in which:

FIG. 1 illustrates an example block topology of a vehicle system of one embodiment of the present disclosure;

DETAILED DESCRIPTION

Figure 2:
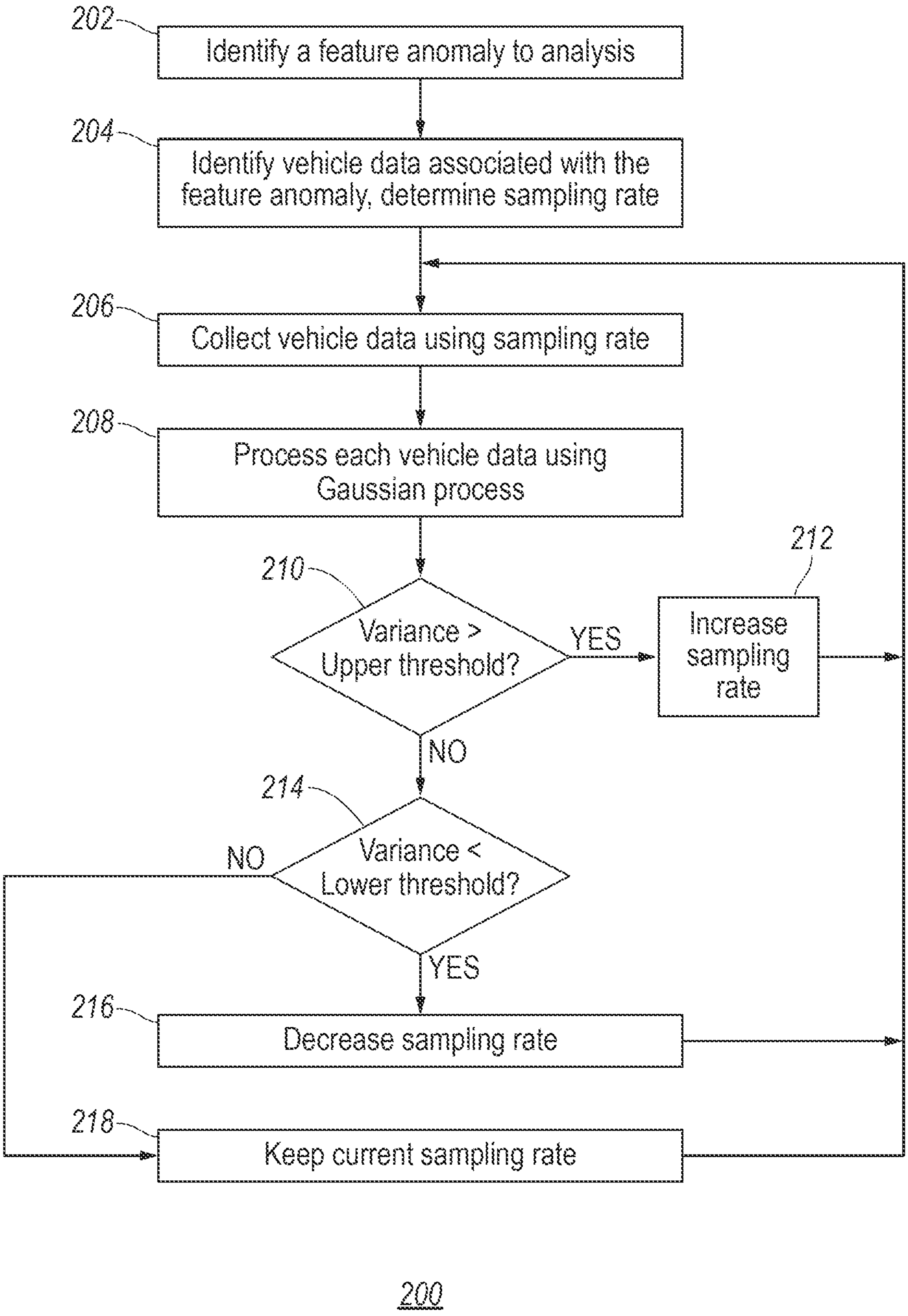
FIG. 2 illustrates an example flow diagram of a vehicle data query process of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes server system to query vehicle data. More specifically, the present disclosure proposes a system for a server to remotely query vehicle data from a plurality of vehicles for feature analysis and issue detections.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Michigan. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle occupants/users to interface with the computing platform 104. For example, the computing platform 104 may receive input from HMI controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, an ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various ECUs 168 of the vehicle 102 configured to perform various operations. For instance, the computing platform 104 may be configured to communicate with a TCU 170 configured to control telecommunication between vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. The server 178 may access various vehicle data 126 from the vehicle 102 via the wireless network 172. It is noted that the terms wireless network and server are used as general terms in the present disclosure and may include any computing network involving carriers, router, computers, controllers, circuitry or the like configured to store data and perform data processing functions and facilitate communication between various entities. The ECUs 168 may further include a powertrain control module (PCM) 180 configured to operate powertrain of the vehicle 102. For instance, the PCM 180 may be configured to start the vehicle responsive to receiving a command from the mobile device 128 via the TCU 170. The ECUs 168 may further include an autonomous driving controller (ADC) 182 configured to control an autonomous driving feature of the vehicle 102. Driving instructions may be received remotely from the server 178. The ADC 182 may be configured to perform the autonomous driving features using the driving instructions combined with navigation instructions from the navigation controller 122. Each ECU 168 may be provided with data processing and storage capabilities to perform operations and store vehicle data 128. The ECUs 168 may be provided with or connected to one or more sensors 184 providing signals related to the operation of the specific ECU 168. For instance, The PCM 180 may be connected to a vehicle speed sensor 184 configured to provide signals of a driving speed of the vehicle, and one or more engine sensors 184 configured to monitor engine operation and provide sensing data such as ignition timing. Each ECU 168 may be provided with diagnostics features and configured to generate DTCs responsive to detecting a predefined condition. The vehicle 102 may be configured to allow the server 178 to query and obtain vehicle data 128 stored at each respective ECU 168 and/or the storage device 110 for analysis. Responsive to receiving a data query request from the server 178, the ECUs 168 may collect vehicle data at a predefined sampling rate and send the vehicle data 128 to the server periodically and/or in real time.

Referring to FIG. 2, an example flow diagram of a vehicle data query process 200 of one embodiment of the present disclosure is illustrated. With continuing reference to FIG. 1, the data query process 200 may be implemented via the server 178 in communication with the vehicle 102. At operation 202, the server 178 identifies a vehicle feature to analyze for issues. The vehicle feature issue may be manually submitted to the server 178 as a ticket by a manufacture technician. For instance, the ticket may include engine misfire detections and analysis for vehicles with certain model engines. In response, the server 178 identifies a plurality of vehicles that qualifies for the ticket using a database indicative of those vehicles equipped with the engine at issue. At operation 204, the server identifies one or more vehicle data entry associated with the feature analysis. Continuing with the above engine misfire example, the data entries that are associated with the analysis may include vehicle speed, engine ignition timing, engine temperature or the like. The server 178 further determines an initial sampling rate at which the respective ECU 168 collect and record the vehicle data. The initial sampling rate may be a predefined rate associated with the feature analysis. Alternatively, the initial sampling rate may be determined by the server 178 based on the number of data entry as identified. Since the vehicles may have limited wireless transmission bandwidth and data allowance, an over-stringent (i.e. high) sampling rate may be unpractical for the vehicle to transmit the vehicle data 128 to the server 178. On the other hand, a low sampling rate may result in insufficient data for the feature analysis. The server may perform a transmission test to each identified vehicle 102 to determine the available bandwidth and data allowance such that the sampling rate for each vehicle 102 may be customized. Additionally, the server 178 may determine the initial sampling rate based on the number of vehicles as identified. The initial sampling rate may be reversely proportional to the number of vehicle samples for instance.

At operation 206, the server 178 sends a data query to the vehicles as identified to collect the vehicle data remotely from the vehicles. The data query may identify the vehicle data entries the server 178 intends to collect and include the initial sampling rate. Responsive to a successful data collection from the vehicles 102 over a predefined period of time, at operation 208, the server 178 processes the vehicle data using the Gaussian process for the feature analysis to determine one or more feature analysis result. The feature analysis result after the Gaussian process may include two major components—a mean value and a variance of the feature being analyzed. The mean value is indicative of an estimated value corresponding to each vehicle data input. The variance is indicative of an upper and lower range from the mean value that the actual quantified value may fall into. In other words, the variance is indicative of an accuracy and/or confidence of the vehicle data measurement received from each specific vehicle 102.

Figure 3A:
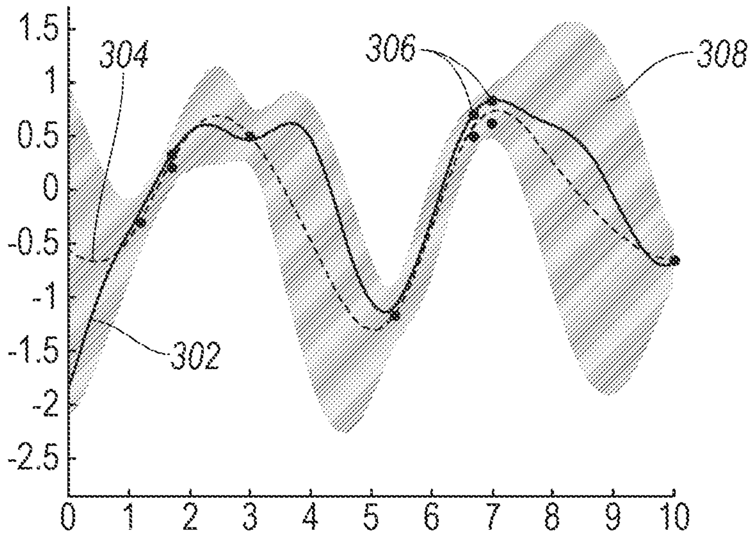
FIGS. 3A-3C illustrate example waveform diagrams of a feature analysis of one embodiment of the present disclosure.
Figure 3B:
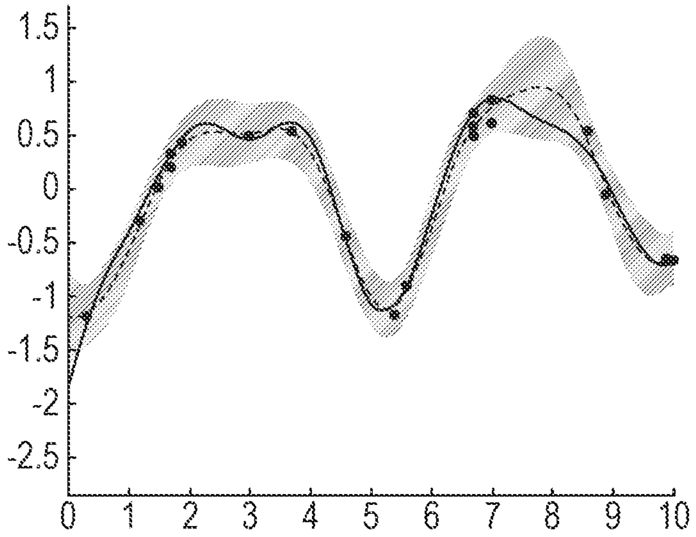
Figure 3C:
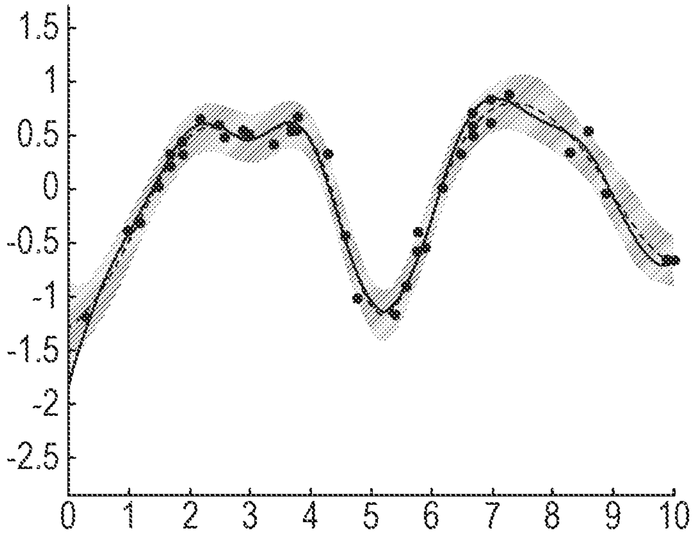

Referring to FIGS. 3A-3C, example waveform diagrams of the feature analysis are illustrated. FIG. 3A illustrates a first waveform diagram 300A corresponding to a low sampling rate; FIG. 3B illustrates a second waveform diagram 300B corresponding to a medium sampling rate; and FIG. 3C illustrates a third waveform diagram 300C corresponding to a high sampling rate. While the horizontal axis of the diagrams indicates a value of an input vehicle data, the vertical axis indicates a quantified value of the vehicle feature to be analyzed. Continuing with the above engine misfire analysis for example, the horizontal axis may indicate vehicle data such as vehicle speed, engine temperature, or ignition timing as measured via one or more vehicle sensors 184, and the vertical axis may indicate engine misfire detected and measured via the sensors 184. It is noted that the numerical value illustrated in the diagrams are merely illustrative (e.g. quantified, and/or normalized) and do not represent the actual value as measured. Taking the first waveform diagram 300A for instance, a solid line represents a real value 302 of the feature being analyzed. The dashed line represents the mean value 304 estimated based on a plurality of samples 306 represented by individual dots. The variance 308 extending from the estimated mean value 308 is denoted in the shaded area. In general, the variance may depend on the number of input samples. As illustrated in FIG. 3A, the variance 308 is relatively small between input values 1 and 2, and input values 5 and 7 as more sample points are within those regions. As a result, the estimated mean value 304 is close to the actual value 302 which means that feature analysis accuracy is relatively high. In contrast, the variance 308 is relatively great between input values 3 and 4.5, and input values 7 and 9 as fewer sample points are within those regions. As illustrated, the estimated mean value 304 deviates from the actual value 302 in those regions and the feature analysis accuracy is relatively low. Compared with the data graph illustrated in FIG. 3A, the variance 308 illustrated in FIG. 3B is comparably small as more samples are taken into account. The variance 308 illustrated in FIG. 3C is even smaller due to the greatest number of samples and the feature analysis accuracy is the most accurate among all three examples.

Returning to FIG. 2, at operation 210 the server 178 compares the variance 308 against an upper threshold to determine if the current sampling rate is too low for an accurate feature analysis. The variance used in operation 210 may be an average variance of one or more vehicle data entries as an example. If the variance is above the upper threshold, the process proceeds to operation 212 and the server sends an updated ticket with an increased sampling rate to the vehicles 102 and continue to receive the vehicle data 128 at the increased sampling rate. At operation 214, the server 178 compares the variance 308 against a lower threshold to determine if the current sampling rate is too high resulting in unnecessary vehicle data 128 sent to the server causing a waste to the wireless transmission. If the answer is a yes, the process proceeds to operation 216 and the server sends an updated ticket with a decreased sampling rate to the vehicles 102 and continue to receive the vehicle data 128 at the decreased sampling rate. The amount of increase and decrease for the sampling rate may be a predefined value with each adjustment. Alternatively, the server 178 may determine the amount of adjustment based on the magnitude of the variance 308. As an example, a significant deviation from the upper or lower threshold may result in a greater sampling rate adjustment whereas a minor deviation may result in a lessor sampling rate adjustment. If the answer is a no at operation 214 indicative of the current sampling rate is appropriate, the process proceeds to operation 218 to keep the current sampling rate and continue to receive the vehicle data 128 for feature analysis. Additionally or alternatively, even if the current variance is within the preferred range, the server 178 may further adjust the sampling rate using the updated number of vehicle samples and wireless data package of each vehicle 102. As the feature analysis may be performed over an extended period of time (e.g. months), the vehicle sample number may change. The server 178 may increase the sampling rate if the vehicle sample number reduces and increase the sampling rate if vehicle sample number increases. Similarly, the server 178 may increase the sampling rate for one or more vehicles if more wireless bandwidth and/or data allowance becomes available, and decrease the sampling rate if less wireless bandwidth and/or data allowance becomes available.

Figure 4:
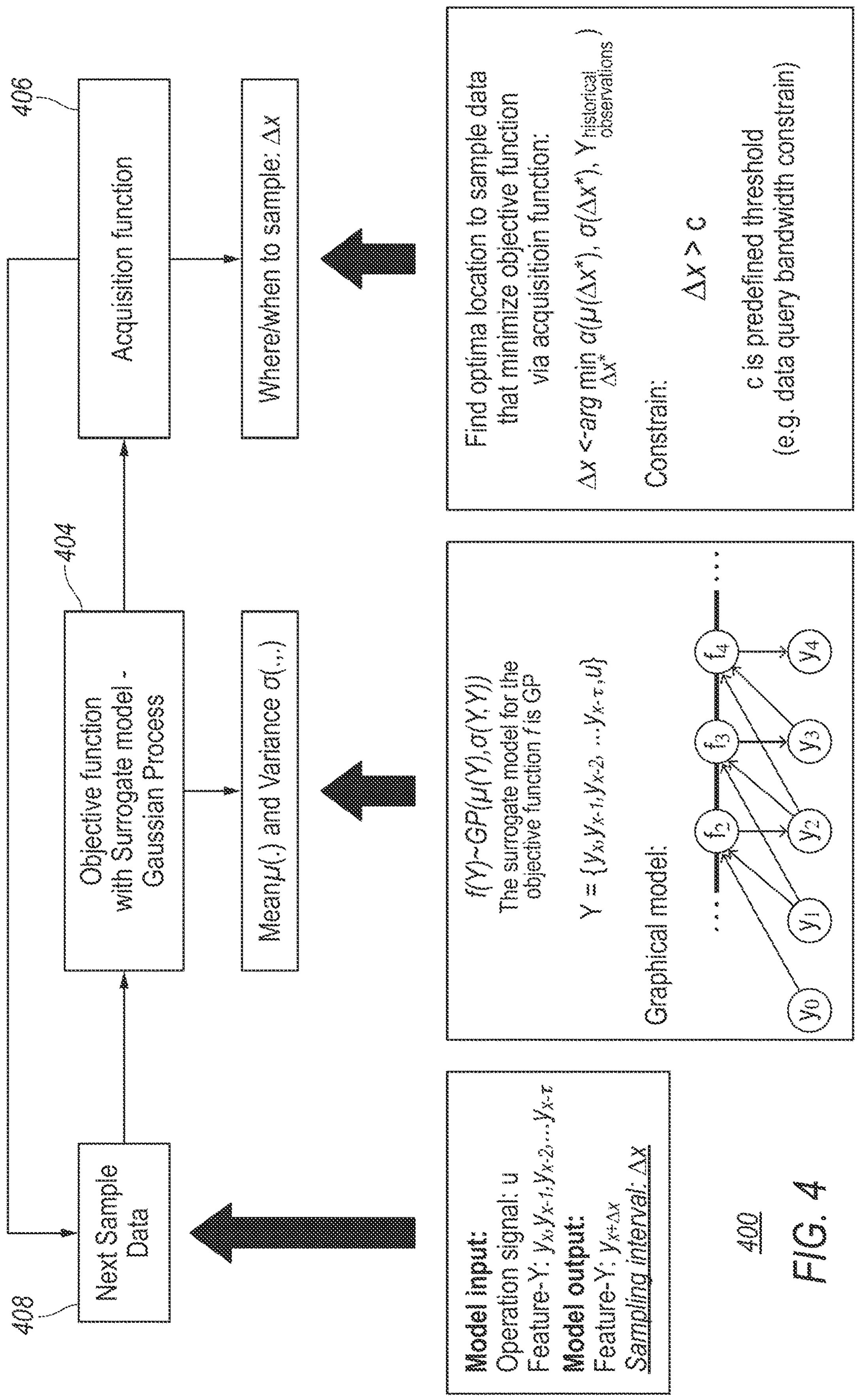
FIG. 4 illustrates an example flow diagram of a Gaussian process of one embodiment of the present disclosure.

Referring to FIG. 4, an example flow diagram 400 of a Gaussian process time series analysis with Bayesian Optimization of one embodiment of the present disclosure is illustrated. With continuing reference to FIGS. 1-3, the process 400 may be implemented via the server 178 to perform the Gaussian process. Bayesian optimization may be utilized in the present disclosure to determine the sampling rate. At operation 404, an objective function $f$ may be evaluated using a simpler surrogate model $\hat{f}$ which may be built with one or more neural network, support vector machines, random forests, Gaussian processes or the like. In the present example as illustrated in FIG. 4, the Gaussian process providing a mean value $\mu$ and a variance $\sigma$ is used to establish the surrogate function $\hat{f}$ presented in the formula below. Since the surrogate function $\hat{f}$ is established using the Gaussian process, the surrogate function $\hat{f}$ may be denoted as GP in the present embodiment.

$$f(Y) \sim GP(\mu(Y), \sigma(Y,Y))$$

Y denotes one or more observation vector which may include any vehicle operation signals, and/or health indication measured directly or indirectly from the target system.

The result of the objective function 204 is output to operation 406 for further processing using an acquisition function. The acquisition function may be configured to compute the surrogate module and guide the selection of the next evaluation point to optimize the condition al probability of the locations in the search space to generate the next sample. The acquisition function may be further configured to balance an exploitation and an exploration of the system. The exploitation may represent a sampling where the surrogate model predicts a high (maximization) and/or low (minimization) objective. The exploration may represent a sampling at locations where the prediction uncertainty is high (e.g. above a threshold). The following equation may be used to determine the next sampling points Δx.

$$\Delta x = \underset{\Delta x^*}{\operatorname{argmin}}\ \alpha(\mu(\Delta x^*), \sigma(\Delta x^*), Y_{historical\ observations})$$

The next sample data may be obtained using the next sampling points Δx at operation 408. The process 400 returns to 404 to repeat the determination. The sampling points Δx may be further subject to restrictions such as wireless bandwidth constraints.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:

a first vehicle, including:

a controller, programmed to perform a vehicle operation; and a server, including:

an interface configured to communicate with a plurality of vehicles including the first vehicle; and a processor, programmed to, send a query for sampling to the plurality of vehicles, the query identifying types of vehicle data and indicating an initial sampling rate, responsive to receiving the vehicle data sampled by the vehicles, process the vehicle data to obtain a feature result including an estimated value and a variance extending from the estimated value, responsive to the variance being greater than a first threshold, send a first updated query indicating an increased sampling rate for the sampling to the plurality of vehicles, optimize the sampling using a surrogate model built via a neural network to generate a function output, and balance an exploitation and exploration of the sampling, wherein the exploitation reflects the sampling where the surrogate model predicts a high or low objective, and the exploration reflects a sampling location associated with an uncertainty above a predefined threshold.

2. The system of claim 1, wherein the processor of the server is further programmed to:

responsive to the variance being less than a second threshold, send a second updated query indicating a decreased sampling rate to the plurality of vehicles.

3. The system of claim 1, wherein the initial sampling rate is different for different types of vehicle data.

4. The system of claim 1, wherein the processor of the server is further programmed to:

calculate the initial sampling rate by performing a bandwidth test to the plurality of vehicles.

5. The system of claim 4, wherein the processor of the server is further programmed to:

send a first query indicating a first sampling rate to the first vehicle of the plurality of vehicles; and send a second query indicating a second sampling rate to the second vehicle of the plurality of vehicles, the second sampling rate being different from the first sampling rate.

6. The system of claim 1, wherein the processor of the server is further programmed to:

process the vehicle data using a Gaussian process.

7. The system of claim 1, wherein the processor of the server is further programmed to:

responsive to receiving an input indicative of a vehicle feature analysis, identify the plurality of vehicles qualified for the vehicle feature analysis.

8. The system of claim 7, wherein the processor of the server is further programmed to:

periodically re-identify an updated plurality of vehicles qualified for the feature analysis; and responsive to detecting a total number of the updated plurality of vehicles has increased compared with a total number of previously identified plurality of vehicle, send a second updated query indicating a decreased sampling rate to the updated plurality of vehicles.

9. A method, comprising:

performing, via a controller of a first vehicle, a vehicle operation;

generating, via the controller, a request for vehicle feature analysis;

responsive to receiving the request, identifying, via a server, a plurality of vehicles qualified for the vehicle feature analysis, wherein the plurality of vehicles include the first vehicle;

sending, via the server, a query to the plurality of vehicles, the query identifying types of vehicle data and indicating an initial sampling rate;

responsive to receiving the vehicle data sampled by the vehicles, processing, via the server, the vehicle data to obtain a feature result including an estimated value and a variance extending from the estimated value; and responsive to the variance being less than a first threshold, sending, via the server, a first updated query indicating a decreased sampling rate to the plurality of vehicles.

10. The method of claim 9, further comprising:

responsive to the variance being greater than a second threshold, sending, via the server, a second updated query indicating an increased sampling rate to the plurality of vehicles.

11. The method of claim 9, wherein the initial sampling rate is different for different types of vehicle data.

12. The method of claim 9, further comprising:

calculating, via the server, the initial sampling rate by performing a bandwidth test to the plurality of vehicles.

13. The method of claim 12, further comprising:

sending, via the server, a first query indicating a first sampling rate to the first vehicle of the plurality of vehicles; and sending, via the server, a second query indicating a second sampling rate to the second vehicle of the plurality of vehicles, the second sampling rate being different from the first sampling rate.

14. The method of claim 9, further comprising:

periodically re-identifying an updated plurality of vehicles qualified for the feature analysis; and responsive to detecting a total number of the updated plurality of vehicles has increased compared with a total number of previously identified plurality of vehicle, sending a second updated query indicating a decreased sampling rate to the updated plurality of vehicles.

15. The method of claim 9, wherein the controller is at least one of: a powertrain control module, or an autonomous driving controller, and the vehicle operation is at least one of: a vehicle powertrain operation by the powertrain control module, or an autonomous driving maneuver by the autonomous driving controller.

16. A non-transitory computer readable medium comprising instructions, when executed, make a first vehicle:

perform a vehicle operation; and make the server:

responsive to receiving an input indicative of a vehicle feature analysis, identify a plurality of vehicles qualified for the feature analysis, wherein the plurality of vehicles include the first vehicle;

send a query for sampling to the plurality of vehicles, the query identifying types of vehicle data and indicating an initial sampling rate, responsive to receiving the vehicle data sampled by the vehicles, process the vehicle data to obtain a feature result including an estimated value and a variance extending from the estimated value, responsive to the variance being greater than a first threshold, send a first updated query indicating an increased sampling rate to the plurality of vehicles, optimize the sampling using a surrogate model built via a neural network to generate a function output, and balance an exploitation and exploration of the sampling, wherein the exploitation reflects the sampling where the surrogate model predicts a high or low objective, and the exploration reflects a sampling location associated with an uncertainty above a predefined threshold.

17. The non-transitory computer readable medium of claim 16 further comprising instructions, when executed, make the server:

responsive to the variance being less than a second threshold, send a second updated query indicating a decreased sampling rate to the plurality of vehicles.

18. The non-transitory computer readable medium of claim 16 further comprising instructions, when executed, make the server:

send a first query indicating a first sampling rate to the first vehicle of the plurality of vehicles; and send a second query indicating a second sampling rate to the second vehicle of the plurality of vehicles, the second sampling rate being different from the first sampling rate.

19. The non-transitory computer readable medium of claim 16 further comprising instructions, when executed, make the server:

periodically re-identify an updated plurality of vehicles qualified for the feature analysis; and responsive to detecting a total number of the updated plurality of vehicles has increased compared with a total number of previously identified plurality of vehicle, send a second updated query indicating a decreased sampling rate to the updated plurality of vehicles.

20. The non-transitory computer readable medium of claim 16, wherein the initial sampling rate is different for different types of vehicle data.

* * * * *